(12) United States Patent
Martinez

(10) Patent No.: US 9,295,222 B2
(45) Date of Patent: Mar. 29, 2016

(54) WINDOW FELINE SEAT AND BLIND PROTECTOR

(71) Applicant: Christina M. Martinez, Temple, TX (US)

(72) Inventor: Christina M. Martinez, Temple, TX (US)

( * ) Notice: Subject to any disclaimer, the term of this patent is extended or adjusted under 35 U.S.C. 154(b) by 44 days.

(21) Appl. No.: 14/171,897

(22) Filed: Feb. 4, 2014

(65) Prior Publication Data

US 2015/0216140 A1    Aug. 6, 2015

(51) Int. Cl.
*A01K 29/00* (2006.01)
*A01K 1/035* (2006.01)
*E06B 7/28* (2006.01)

(52) U.S. Cl.
CPC .. *A01K 1/035* (2013.01); *E06B 7/28* (2013.01)

(58) Field of Classification Search
CPC ......... A01K 1/00; A01K 1/0035; A01K 1/03; A01K 1/035; A01K 1/0353
USPC ......... 119/428, 431, 459, 461, 474, 491, 498, 119/499, 513, 28.5; 47/68; D30/108–112, D30/118, 119, 120, 199
See application file for complete search history.

(56) References Cited

U.S. PATENT DOCUMENTS

| | | | | |
|---|---|---|---|---|
| 3,114,376 A * | 12/1963 | Rexroat | ........................ | 135/121 |
| 3,155,427 A * | 11/1964 | Necessary | ................ | 297/184.14 |
| 4,445,459 A * | 5/1984 | Julie | ........................... | 119/28.5 |
| 4,865,066 A * | 9/1989 | Brooks | ........................ | 135/121 |
| 4,869,451 A | 9/1989 | Gordon | | |
| 5,148,767 A | 9/1992 | Torchio | | |
| 5,167,202 A | 12/1992 | Bradford et al. | | |
| 5,335,618 A * | 8/1994 | Zarola | ........................... | 119/498 |
| 5,337,697 A | 8/1994 | Trimarchi et al. | | |
| 5,469,807 A | 11/1995 | Kosmaczeska | | |
| 5,782,205 A * | 7/1998 | Veras | ........................... | 119/484 |
| 5,890,455 A * | 4/1999 | Donchey | ....................... | 119/484 |
| 6,944,990 B2 | 9/2005 | Noyes | | |
| 7,228,820 B1 * | 6/2007 | Kellogg et al. | ............... | 119/498 |
| 7,614,363 B2 | 11/2009 | Di Angelo et al. | | |
| 7,669,556 B2 | 3/2010 | Reusche et al. | | |
| 7,861,674 B2 | 1/2011 | Mercier | | |
| 2006/0042558 A1 | 3/2006 | Stephens | | |

\* cited by examiner

*Primary Examiner* — Richard Price, Jr.
(74) *Attorney, Agent, or Firm* — Dale J. Ream

(57) ABSTRACT

A feline window seating apparatus for placement in a window frame encasing a window includes primary housing having a lower portion having longitudinally opposed first and second ends, the lower portion having an outer free edge extending between the opposed first and second ends that is selectively coupled to the window frame and an inner edge opposite the outer edge. The seating apparatus includes an upper portion having longitudinally opposed first and second ends, the upper portion having a lower edge extending between the first and the second ends and connected to the inner edge of the lower portion and an opposed upper edge such that the upper portion extends upwardly from the lower portion. The upper portion and lower portion collectively define an interior area and an open side extending between the inner free edge of the lower portion and the upper edge of the upper portion.

19 Claims, 5 Drawing Sheets

WINDOW FELINE SEAT AND BLIND PROTECTOR

BACKGROUND OF THE INVENTION

This invention relates generally to pet enclosures and, more particularly, to a feline seat and blind protection apparatus for mounting in a window frame adjacent a window that enables a cat to sit and look out of the window while blocking persons on the outside from seeing into the dwelling and enables the window blinds to be protected from a cat sitting in the window.

Cats are known to enjoy perching themselves near a window in a dwelling where they can sometimes spend hours looking at an area outside of the window. Similarly, cats enjoy being near a window so as to bask in the sunshine, especially in the wintertime or in other circumstances when they cannot go outside. Generally, a cat is unable to look out of a window if the blinds (such as mini-blinds) have been lowered—which is normally the case when the residents are not home or just do not wish for persons outside the dwelling to be able to look in through an uncovered window. Cats often force the blinds out of the way, lay on the blinds, or otherwise cause damage to the blinds in an effort to look outside or to expose the sunshine.

Various device have been proposed in the prior art that enable a cat to perch adjacent a window and, as a result, be able to view the outside environment or bask in the sunshine. Although assumably effective for their intended purposes, the existing devices or patent proposals do not simultaneously enable the window coverings to be lowered while still enabling the cat to look out through the window. At best, the window blinds can only be partially lowered to the top of the feline perch which still allows persons on the outside to look in around or even through the feline perch device. Since lowered blinds do not keep cats from sitting on the window/window sill, but sometimes results in bent or broken blinds, this product enables the blinds to sit on top of the product, protecting the blinds.

Therefore, it would be desirable to have a feline window seating apparatus that is coupled to a window frame and enables a cat to look out of the window. Further, it would be desirable to have a feline window seating apparatus that allows window blinds to be lowered to the top of a housing and includes a construction that blocks views around or through the apparatus.

SUMMARY OF THE INVENTION

A feline window seating apparatus for placement in a window frame encasing a window according to the present invention includes a primary housing having a lower portion having longitudinally opposed first and second ends, the lower portion having an outer free edge extending between the opposed first and second ends that is selectively coupled to the window frame and an inner edge opposite the outer edge. The seating apparatus includes an upper portion having longitudinally opposed first and second ends, the upper portion having a lower edge extending between the first and the second ends and connected to the inner edge of the lower portion and an opposed upper edge such that the upper portion extends upwardly from the lower portion. The upper portion and lower portion collectively define an interior area and an open side extending between the inner free edge of the lower portion and the upper edge of the upper portion.

Therefore, a general object of this invention is to provide a feline window seating apparatus having a primary housing that couples to a window frame and is configured to enable a cat to look out of a window while window blinds can still be lowered to prevent visibility into a dwelling.

Another object of this invention is to provide a feline window seating apparatus, as aforesaid, that extends between the entire width of a window frame and includes an opaque construction that prevents viewers from outside the window to view either beside or through the apparatus.

Still another object of this invention is to provide a feline window seating apparatus, as aforesaid, that is coupled to a window sill and extends rearwardly to provide adequate room for a cat to sit or lay down on a lower portion thereof.

Yet another object of this invention is to provide a feline window seating apparatus, as aforesaid, having open ends through which a cat may easily enter or exit.

A further object of this invention is to provide a feline window seating apparatus, as aforesaid, that is easily installed or removed from a window frame.

A still further object of this invention is to provide a feline window seating apparatus, as aforesaid, that is cost-effective to produce and to purchase.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is an isolated view on an enlarged scale taken from a portion of FIG. 1a;

DESCRIPTION OF THE PREFERRED EMBODIMENT

Figure 1A:
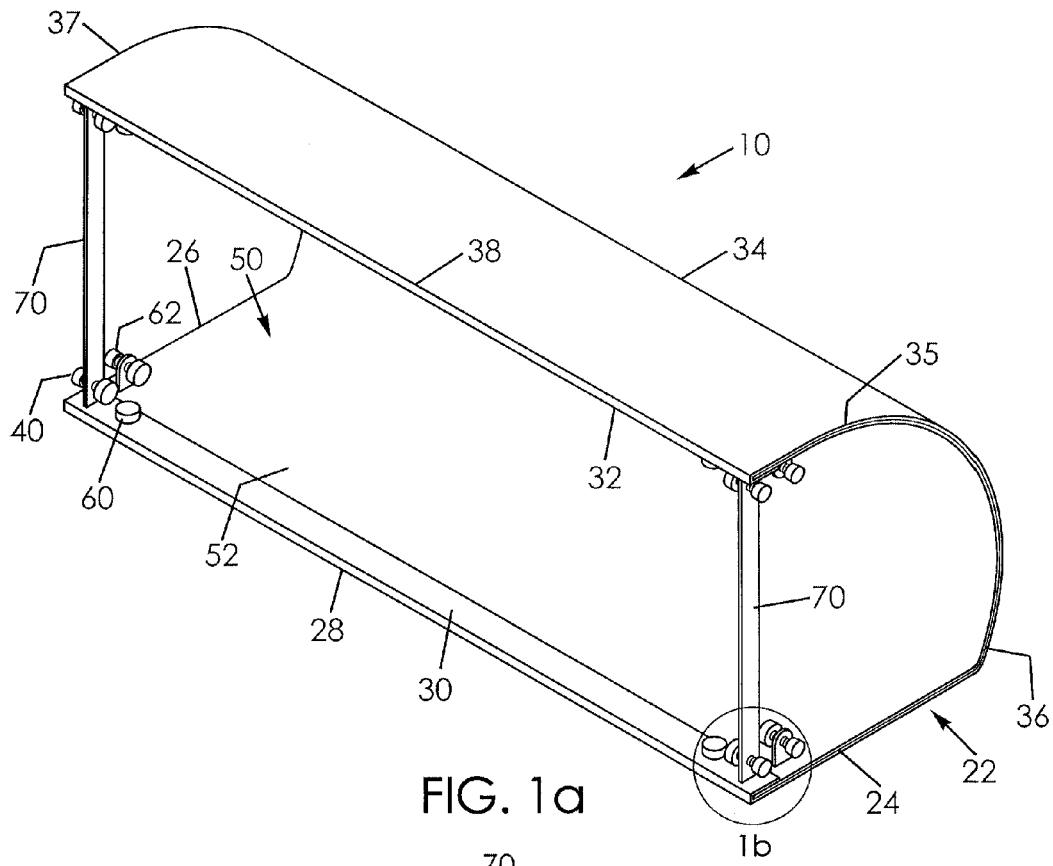
FIG. 1a is a perspective view of a feline window seating apparatus according to an embodiment of the present invention.

A window feline window seating apparatus according to the present invention will now be described with reference to FIGS. 1a to 5 of the accompanying drawings. The window feline seating apparatus 10 includes a primary housing 20 configured to be attached to a window frame 7 and may include an auxiliary housing 50 slidably movable relative to the primary housing 20 so as to adjust the length of the seating apparatus 10 to the width of the window frame 7.

The primary housing 20 includes a lower portion 22 and an upper portion 34 extending upwardly from the lower portion 22. More particularly, the lower portion 22 includes longitudinally opposed first 24 and second 26 ends, the lower portion having a generally planar surface extending between the first 24 and second 26 ends. The planar surface is configured to rest upon the window sill 8 of a window frame 7 as will be described in greater detail later.

Figure 3:
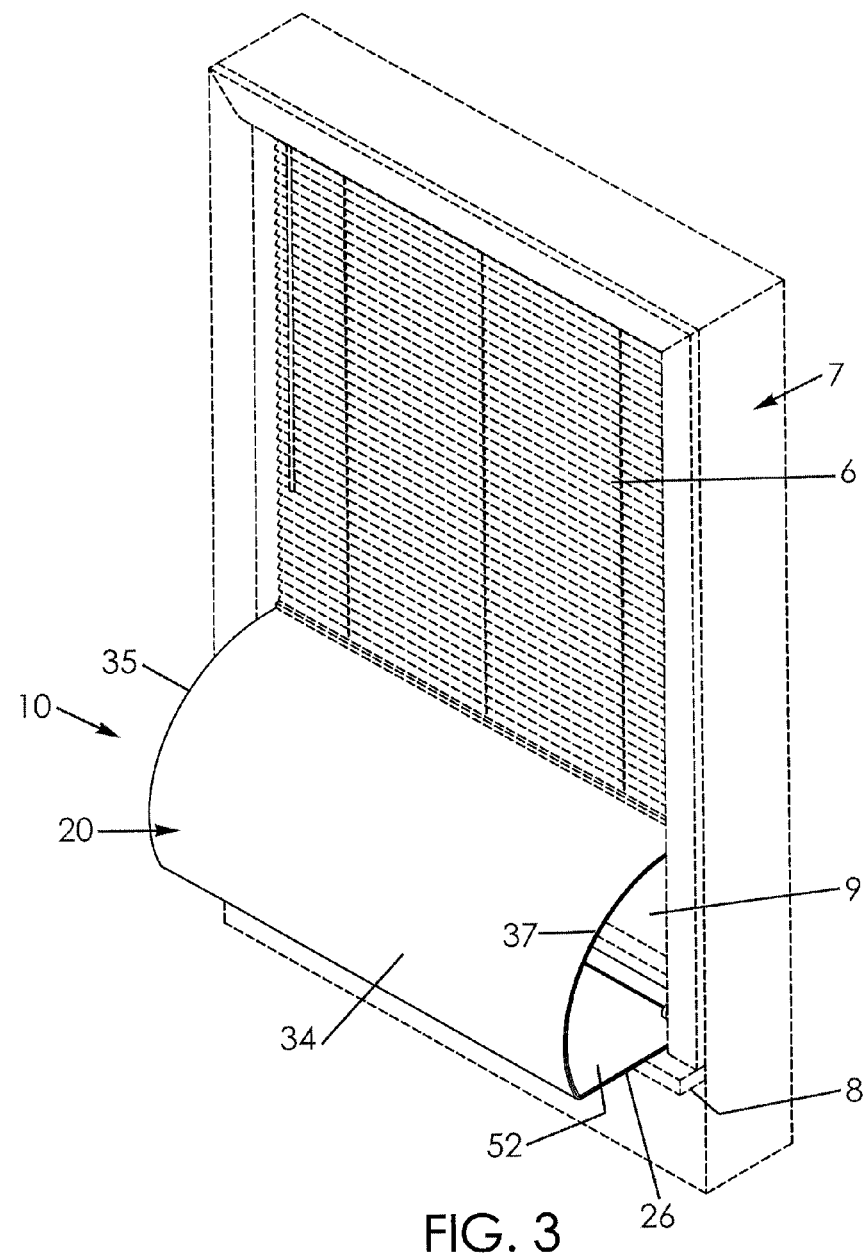
FIG. 3 is a perspective view of the seating apparatus as in FIG. 1a illustrated mounted to a window frame.

The lower portion 22 includes an outer free edge 28 extending between the first 24 and second 26 ends, the outer free edge 28 being the longitudinal edge that is adjacent a window when the lower portion 22 is mounted to the window frame 7 (FIG. 3). The lower portion 22 also includes an inner edge 32 opposite the outer edge 28. Alternatively, the inner edge 32 may merely be an inner "area" in that the entire primary housing 20 may have a fluid semicircular configuration without any fixed delineation between lower and upper portions. The lower portion 22 and upper portion 34 may include a unitary construction constructed primarily of a durable plastic material.

The upper portion 34 of the primary housing 20 includes longitudinally opposed first 35 and second 37 ends. The upper portion 34 includes a lower edge 36 extending between the first 24 and second 26 ends of the primary housing 20 connected to said inner edge or inner area of the lower portion 22 and an opposed upper edge 38 such that said upper portion 34 extends upwardly from said lower portion 22 (FIG. 1a). The upper portion 34 may include a generally arcuate, arched, or curved configuration such that the upper edge 38 thereof is parallel to the outer free edge 28 of the lower portion 22. Preferably, the primary housing 20 is constructed of an opaque material so that a person outside the dwelling cannot see through the apparatus 10 and into the home.

The lower portion 22 and upper portion 34 collectively define an interior area having sufficient area to receive at least one feline and also defines an open side between the outer free edge 28 of the lower portion 22 and upper edge 38 of the upper portion 34, the open side being situated adjacent a window when the primary housing 20 is mounted to a window frame 7 (FIG. 3). Stated another way, the upper edge 38 of the upper portion 34 and the outer free edge 28 are adjacent the window 9 when the lower portion 22 is coupled to the window frame 7.

The primary housing 20 may be coupled to a window frame 7 with auxiliary clamping fasteners 40 of the like. More particularly, an auxiliary clamping fastener 40 may be coupled to an upper surface of the outer free edge 28 of the lower portion 22 adjacent the first end 24 thereof. Preferably, the auxiliary clamping fastener 40 includes a threaded bolt, screw, or pin with opposed knobs that may be selectively operated to extend outwardly into contact with a window frame 7 on either side of a window sill 8. Another auxiliary clamping fastener 40 may be similarly positioned adjacent a first end 35 of the upper portion 34 of the primary housing 20. And, in one embodiment, similar clamping fasteners may be positioned in an opposite direction adjacent respective second ends 26, 37 of the lower portion 22 and upper portion 34 of the primary housing. Together, therefore, the auxiliary clamping fasteners 40 may be operated to apply force in opposed directions so as to tightly secure the primary housing 20 between opposed sides of a window frame 7. It is understood that each auxiliary clamping fastener 40 may be a clamping knob, a thumb screw, a traditional screw, bolt, clasp, or the like. Preferably, the fasteners provide firm pressure against a wall without penetration although a penetrating fastener like a screw would also be functionally suitable.

Further, respective first ends 24, 35 of the lower 24 and upper 34 portions collectively define a first open end 42 configured to allow access to the interior area. Similarly, respective second ends 26, 44 of the lower 22 and upper 34 portions collectively define a second open end 44 configured to allow access to the interior area. In use, a cat is able to enter into the interior area through either open end. In one embodiment, a flexible partition 46, such as a curtain, may be coupled to a first end of the upper portion 34 and hang downwardly so as to substantially cover the first open end. Of course, a similar curtain structure may be positioned to cover the second open end as well.

In one embodiment, the feline window seating apparatus 10 may include an auxiliary housing 50 (FIG. 2) for use in cooperation with the primary housing 20, the auxiliary housing 50 having a construction that is substantially similar to that of the primary housing 20 except as specifically noted below. The auxiliary housing 50 includes an auxiliary lower portion 52 having longitudinally opposed ends and an outer free edge 28 extending therebetween that may be selectively coupled to a window frame 7 with auxiliary clamping fasteners 40. The auxiliary housing 50 also includes an auxiliary upper portion 56 having longitudinally opposed first and second ends. The auxiliary upper portion 56 is connected, integrally or separately, to an inner edge or area of the auxiliary lower portion 52 and extends upwardly therefrom. The auxiliary upper portion 56 includes an auxiliary upper edge 58 generally parallel to the auxiliary lower portion outer free edge 28 so as to define an interior area and open side as described previously with regard to the primary housing 20.

Figure 1B:
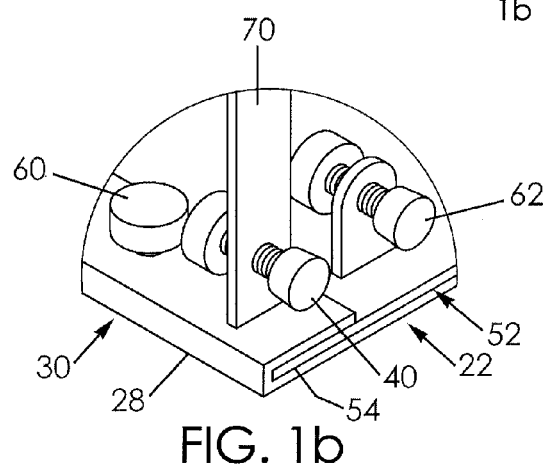
Figure 2:
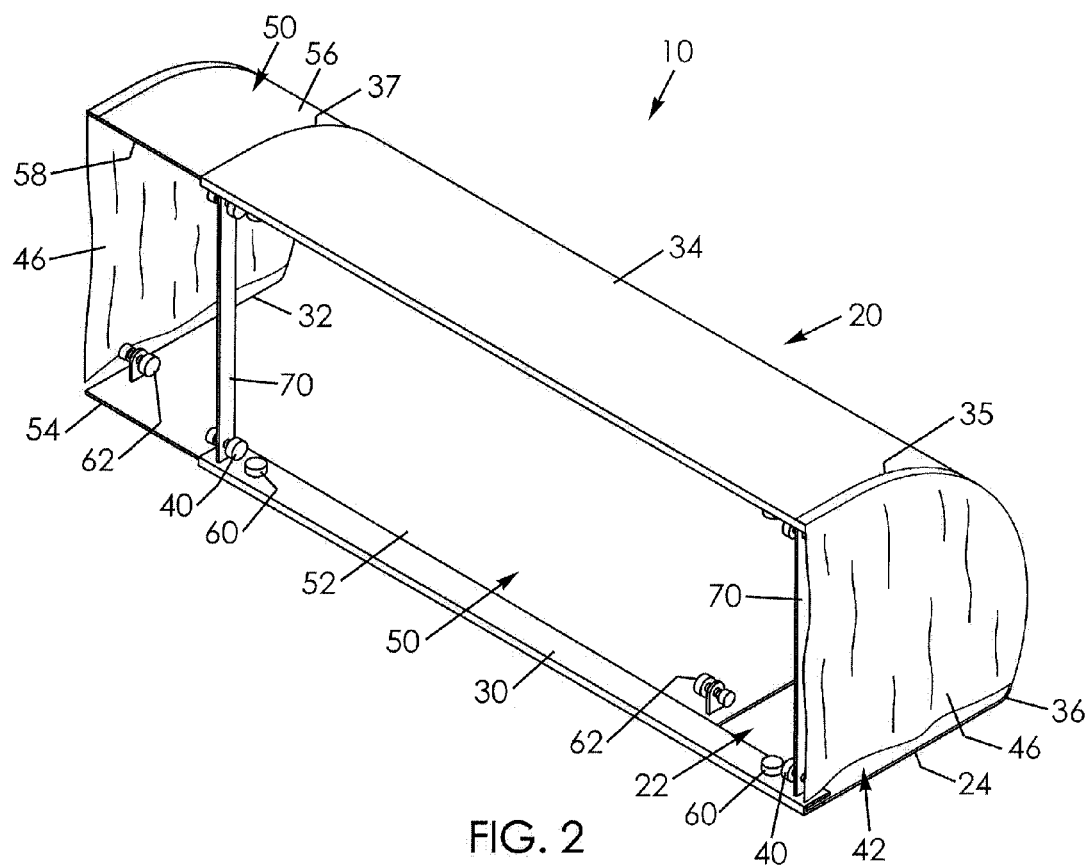
FIG. 2 is a perspective view of a feline window seating apparatus according to another embodiment of the present invention illustrated in an extended configuration.
Figure 4:
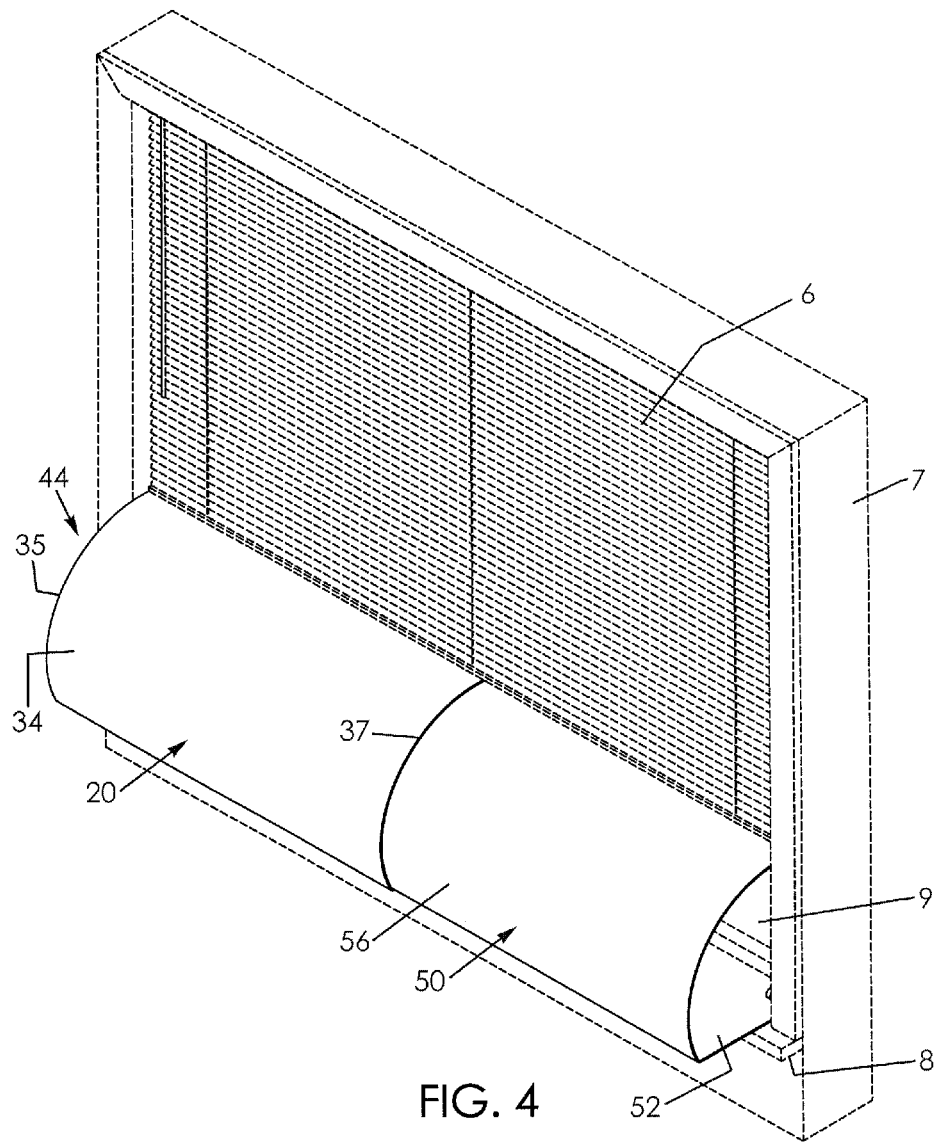
FIG. 4 is a perspective view of the seating apparatus as in FIG. 2 illustrated at an extended configuration and mounted to window frame.

It is understood that the entire auxiliary housing 50 (lower and upper portions) has dimensions that are slightly smaller than corresponding dimensions of the primary housing 20. The shape of each, however, is substantially congruent. Therefore, the auxiliary housing 50 may be nested in the interior area of the primary housing 20. As best shown in FIG. 1b, the outer free edge 28 of the lower portion 22 may include a sleeve 30 configured to slidably receive the outer free edge 28 of the auxiliary housing 50. More particularly, the outer free edge 28 of the auxiliary housing 50 is slidable in the sleeve 30 such that the auxiliary housing 50 is selectively movable between a retracted configuration in which the auxiliary housing 50 is completely positioned within the interior area of the primary housing 20 (FIG. 1a) and an extended configuration in which the auxiliary housing extends outwardly from the primary housing 20 (FIG. 2). Clearly, this extensible construction enables the feline window seating apparatus 10 to be utilized with window frames of varied widths (FIG. 4). It is understood that in some embodiments, additional auxiliary housings may be included for use with even wider window frames.

At least one auxiliary fastener 60 is in communication with the outer free edges of the primary and auxiliary housing 50 and is configured to selectively clamp the housing more tightly or less tightly together. In other words, the auxiliary fastener 60 is configured to selectively allow or prevent the auxiliary housing 50 to move relative to the primary housing 20, i.e. between retracted and extended configurations.

The auxiliary housing 50 may also include auxiliary clamping fasteners 62 that are positioned and function in a manner substantially similar to the auxiliary clamping fasteners 40 described above. The auxiliary clamping fasteners 62 are offset from the auxiliary outer free edge 54 so as not to conflict with complementary structures of the primary housing (FIGS. 1a and 1b).

In one embodiment, a partition/curtain 46 may be coupled to the auxiliary housing 50 rather than to the primary housing 20 (FIG. 2). This configuration enables the open end to be covered when the auxiliary housing 50 is extended away from the primary housing 20.

A stabilizing member 70 may extend between the outer free edge 28 of the lower portion 22 and the upper edge 38 of the upper portion 34 of the primary housing 20. The stabilizing member 70 may be a straight rod and constructed of a durable material so as to enhance the stability of the primary housing 20. The auxiliary clamping fasteners 40 of the primary housing 20 may be positioned to extend through respective stabilizing members 70 (FIG. 1a) although it is understood that the stabilizing members 70 may alternatively be positioned at another location along the outer free edge 28 of the lower portion 22. In addition, each stabilizing member 70 may be pivotally coupled to the upper edge 38 of the upper portion 34 and be selectively moved between stowed and deployed configurations.

Figure 5:
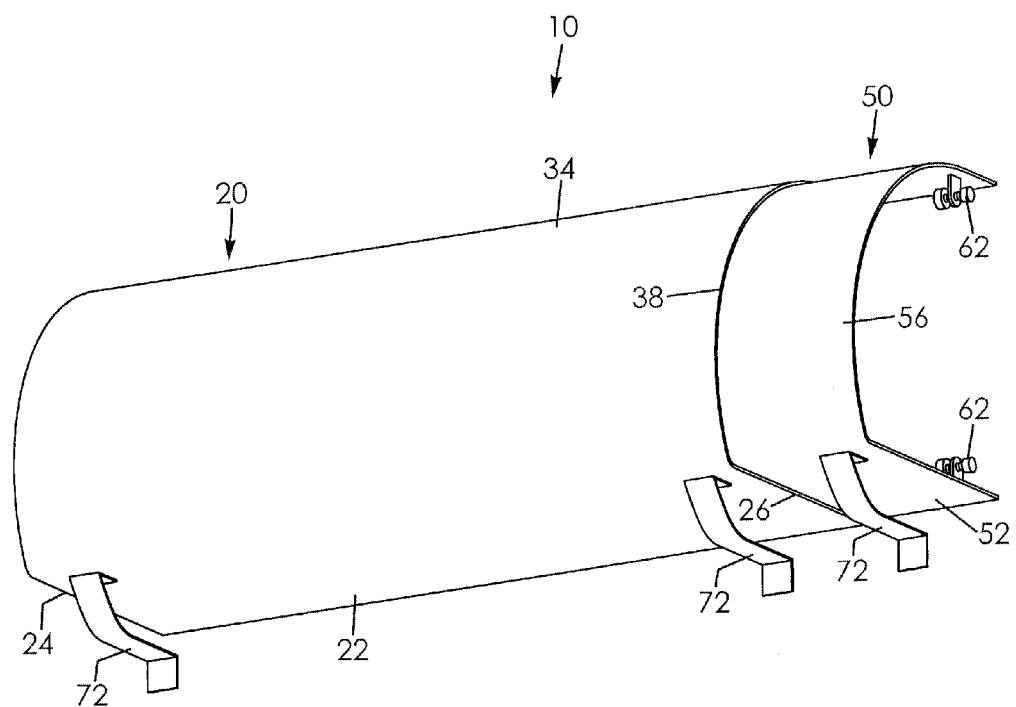
FIG. 5 is a perspective view of the seating apparatus according to another embodiment of the present invention having mounting brackets.

In one embodiment, the feline window seating apparatus 10 is configured to be securely mounted to a window frame that does not sufficient window sill area or perhaps no window sill at all. As shown in FIG. 5, a plurality of brackets 72 may be coupled to a bottom surface of the primary housing lower portion 22 and to a bottom surface of the auxiliary housing lower portion 52. It is understood that a respective mounting bracket 72 may be used in connection with the auxiliary housing 50 when the auxiliary housing 50 is extended from the primary housing 20.

In use, the feline window seating apparatus 10 may be mounted atop a window sill 8 of a window frame 7 within a residential dwelling (FIG. 3). More particularly, the lower portion 22 of the primary housing 20 may be positioned on a window sill 8 such that the open side is adjacent or even in contact with a window. The auxiliary clamping fasteners 40 may be threadably engaged to create a tight friction fit in the window frame 7. A cat is then able to enter into the interior area of the primary housing 20 through a selected open end. If the feline window seating apparatus 10 is being mounted to a wider window frame, such as a double window, then the auxiliary housing 50 may be slidably extended so as to lengthen the apparatus 10 (FIG. 4). Finally, the blinds 6 or other window coverings may be lowered to a point immediately or adjacent or even resting atop the upper portion 34 of the primary housing 20. In this way, a person outside of the dwelling is completely unable to see inside the dwelling in that the blinds are drawn and the primary 20 and auxiliary 50 housing are constructed of an opaque material. Further, the partitions 46 block a view through open ends of the housings.

It is understood that while certain forms of this invention have been illustrated and described, it is not limited thereto except insofar as such limitations are included in the following claims and allowable functional equivalents thereof.

The invention claimed is:

1. A feline window seating apparatus for placement in a window frame encasing a window, comprising:
    a lower portion having longitudinally opposed first and second ends, said lower portion having an outer free edge extending between said opposed first and second ends that is selectively coupled to the window frame and an inner edge opposite said outer edge; and
    an upper portion having longitudinally opposed first and second ends, said upper portion having a lower edge extending between said first and said second ends and connected to said inner edge of said lower portion and an opposed upper edge such that said upper portion extends upwardly from said lower portion;
    wherein said upper portion and said lower portion collectively define an interior area and define an open side extending completely between said inner free edge of said lower portion and said upper edge of said upper portion, said open side not facing the window and being configured to allow feline access to said interior area.

2. The feline window seating apparatus as in claim 1, wherein:
    said lower portion includes a generally planar configuration so as to selectively rest upon a window sill of the window frame;
    said open side is adjacent the window when said bottom wall outer free edge is coupled to the window frame.

3. The feline window seating apparatus as in claim 1, wherein said lower portion and said upper portion include a unitary construction.

4. The feline window seating apparatus as in claim 1, wherein said upper portion has an arcuate configuration such that said upper edge of said upper portion is parallel to said outer free edge of said lower portion.

5. The feline window seating apparatus as in claim 4, wherein said upper edge of said upper portion and said outer free edge of said lower portion are adjacent the window when said lower portion is coupled to the window frame.

6. The feline window seating apparatus as in claim 1, comprising a clamping fastener situated adjacent said first end of said lower portion and configured to selectively attach said lower portion to the window frame.

7. The feline window seating apparatus as in claim 6, wherein said clamping fastener is taken from a group including a clamping knob, a thumb screw, a wing fastener, a screw, a bolt, and a latch.

8. The feline window seating apparatus as in claim 1, wherein:
    respective first ends of said lower portion and said upper portion collectively define a first open end not facing the window and configured to allow access to said interior area; and
    respective second ends of said lower portion and said upper portion collectively define a second open end not facing the window and configured to allow access to said interior area.

9. The feline window seating apparatus as in claim 8, comprising a curtain coupled to said first end of said upper portion and hanging loosely downwardly and having an unconstrained lower edge to selectively cover said first open end.

10. The feline window seating apparatus as in claim 8, comprising a curtain coupled to said second end of said upper portion and hanging loosely downwardly and having an unconstrained lower edge to selectively cover said second open end.

11. The feline window seating apparatus as in claim 1, comprising an auxiliary housing having:
    an auxiliary lower portion having longitudinally opposed first and second ends, said auxiliary lower portion having an outer free edge extending between said opposed first and second ends that is selectively coupled to the window frame and an inner edge opposite said outer edge; and
    an auxiliary upper portion having longitudinally opposed first and second ends, said auxiliary upper portion having a lower edge extending between said first and said second ends and connected to said inner edge of said auxiliary lower portion and an opposed upper edge such that said auxiliary upper portion extends upwardly from said auxiliary lower portion;
    wherein:
        said auxiliary upper portion and said auxiliary lower portion collectively define an interior area and an open side extending completely between said inner free edge of said lower portion and said upper edge of said upper portion so as to allow feline access into said interior area, said open side not facing the window;
        said auxiliary upper portion has dimensions smaller than dimensions of said upper portion;
        said auxiliary lower portion has dimensions smaller than dimensions of said lower portion such that said auxiliary lower portion and said auxiliary upper portion are slidably movable relative to said lower portion and said upper portion, respectively.

12. The feline window seating apparatus as in claim 11, wherein:
said lower portion and said upper portion comprise a primary housing;
said auxiliary housing is configured to selectively move to a retracted configuration inside said interior area of said primary housing or move to an extended configuration outside said interior area of said primary housing.

13. The feline window seating apparatus as in claim 12, comprising an auxiliary fastener adjacent said inner free edge of said lower portion that is configured to selectively prevent or allow said auxiliary housing to move relative to said primary housing.

14. The feline window seating apparatus as in claim 1, wherein at least said upper portion has an opaque construction.

15. The feline window seating apparatus as in claim 1, comprising a plurality of mounting brackets coupled to a lower surface of the lower portion.

16. The feline window seating apparatus as in claim 1, comprising at least one stabilizing member extending between said outer free edge of said lower portion and said upper edge of said upper portion.

17. A feline window seating apparatus for placement in a window frame encasing a window, comprising:
a primary housing that includes:
a lower portion having longitudinally opposed first and second ends, said lower portion having an outer free edge extending between said opposed first and second ends that is selectively coupled to the window frame and an inner edge opposite said outer edge; and
an upper portion having longitudinally opposed first and second ends, said upper portion having a lower edge extending between said first and said second ends and connected to said inner edge of said lower portion and an opposed upper edge such that said upper portion extends upwardly from said lower portion;
wherein said upper portion and said lower portion collectively define an interior area and define an open side extending completely between said inner free edge of said lower portion and said upper edge of said upper portion, said open side not facing the window and being dimensioned for feline access into said interior area;
an auxiliary housing that includes:
an auxiliary lower portion having longitudinally opposed first and second ends, said auxiliary lower portion having an outer free edge extending between said opposed first and second ends that is selectively coupled to the window frame and an inner edge opposite said outer edge; and
an auxiliary upper portion having longitudinally opposed first and second ends, said auxiliary upper portion having a lower edge extending between said first and said second ends and connected to said inner edge of said auxiliary lower portion and an opposed upper edge such that said auxiliary upper portion extends upwardly from said auxiliary lower portion;
wherein said auxiliary housing is configured to selectively move to a retracted configuration inside said interior area of said primary housing or move to an extended configuration outside said interior area of said primary housing;
wherein:
respective first ends of said lower portion and said upper portion collectively define a first open end not facing the window and configured to allow feline access to said interior area;
respective second ends of said lower portion and said upper portion collectively define a second open end not facing the window and configured to allow feline access to said interior area;
said feline window seating apparatus including a flexible curtain coupled to said second end of said upper portion and hanging loosely downwardly and having an unconstrained lower edge to selectively cover said second open end.

18. The feline window seating apparatus as in claim 17, wherein said upper portion has an arcuate configuration such that said upper edge of said upper portion is parallel to said outer free edge of said lower portion.

19. The feline window seating apparatus as in claim 17, comprising a clamping fastener situated adjacent said first end of said lower portion and configured to selectively attach said lower portion to the window frame.

\* \* \* \* \*